United States Patent
Lazinski et al.

[11] Patent Number: 5,896,640
[45] Date of Patent: Apr. 27, 1999

[54] DEFLECTION SEALING APPARATUS AND METHOD

[75] Inventors: Piotr Lazinski; Rajan Puri, both of Mississauga; Andrew Skarsgard, North York, all of Canada

[73] Assignee: Husky Injection Molding Systems Ltd.

[21] Appl. No.: 08/747,281

[22] Filed: Nov. 12, 1996

[51] Int. Cl.$^6$ .................................................. B21D 39/03
[52] U.S. Cl. .............................. 29/428; 29/446; 425/549; 277/560
[58] Field of Search ................................... 29/888.3, 428, 29/446; 425/572, 568, 588, 549; 264/328.15; 285/211, 340; 277/560, 551, 626, 644

[56] References Cited

U.S. PATENT DOCUMENTS

| | | |
|---|---|---|
| 4,279,588 | 7/1981 | Gellert . |
| 4,588,367 | 5/1986 | Schad . |
| 4,682,945 | 7/1987 | Schad . |
| 4,705,473 | 11/1987 | Schmidt ................................. 425/549 |
| 4,921,708 | 5/1990 | Gellert ................................... 425/549 |
| 5,062,648 | 11/1991 | Gomringer ............................. 277/112 |
| 5,269,677 | 12/1993 | Gauler ................................... 425/568 |
| 5,324,191 | 6/1994 | Schmidt ................................. 425/549 |
| 5,374,182 | 12/1994 | Gessner . |
| 5,429,491 | 7/1995 | Gellert . |
| 5,433,183 | 7/1995 | Vasnick ................................. 123/568 |
| 5,507,637 | 4/1996 | Schad et al. . |
| 5,554,395 | 9/1996 | Hume .................................... 425/549 |
| 5,797,603 | 8/1998 | Voirol et al. ........................... 277/602 |
| 5,820,899 | 10/1998 | Gellert .................................. 425/549 |

Primary Examiner—S. Thomas Hughes
Assistant Examiner—Steve Blount
Attorney, Agent, or Firm—Bachman & LaPointe, P.C.

[57] ABSTRACT

Apparatus and method for sealing the passageway between two conduits in an injection molding apparatus, including two abutting conduits for transporting molten plastic under pressure having an interface between the abutting conduits, and a device for sealing the interface between the two abutting conduits operative induce a sealing stress distribution that reaches a maximum value adjacent the common longitudinal axis of the abutting conduits.

5 Claims, 4 Drawing Sheets

DEFLECTION SEALING APPARATUS AND METHOD

BACKGROUND OF THE INVENTION

The present invention relates to a method and apparatus for sealing the passageway between two conduits located in an injection mold and transporting high pressure, heated molten plastic towards mold cavities in a cycling operation.

Avoiding leakage of the hot and pressurized molten plastic material represents a major concern when designing an injection molding machine or an injection mold. For example, a critical leakage area in an injection molding machine is between the machine's injection nozzle and the mold's sprue bushing. Leakage commonly appears in an injection molding machine between the manifold and the mold nozzles or at the interface between the mold nozzle and the cavity mold.

Injection molding manifolds are usually made of a massive runner block communicating with the injection nozzles located adjacent the mold cavities. Leakage of the molten plastic material traveling from the runner block to the injection nozzle, for example, represents a major problem caused by the high pressure of the heated, flowing molten plastic and the relative thermal expansion of the materials which makes the runner block slide laterally with respect to the injection nozzles. Sealing of the fluid passageway between the internal conduits located in the runner block or manifold and the injection nozzle represents, therefore, a crucial design problem, especially taking into account that the injection process must be stopped if leakage occurs.

Several sealing methods and elements have been developed, but these do not satisfactorily solve the leakage problem especially at the interface between the manifold and the mold nozzle.

Known design concepts in injection molds use a small pre-load in cold conditions between the manifold and the nozzle. This additional pre-load accompanies the inherent thermal expansion of the manifold to provide sufficient compression between the parts to maintain sealing between the manifold and nozzle or between other conduits in the system. However, while too little compression results in plastic leakage, extreme compression causes either permanent setting of the manifold steel or damage to the nozzle housing. In addition to this, the prolonged and cyclic injection molding operation will reduce the effectiveness of the pre-load, thus increasing the likelihood of leakage.

Several improvements to these design concepts have been developed that use different methods and means to prevent leakage of the plastic resin.

U.S. Pat. No. 4,588,367 to Schad teaches a thermal expansion element to seal the flow of resin through the passageway between the manifold conduit and injection nozzle, or a thermal expansion element with an undercut to give it additional elastic sealing properties, or a thermal expansion element with a spring element to enhance the sealing properties by adding an elastic feature. The thermal expansion element allows relative movement between the manifold, thermal expansion element and nozzle.

U.S. Pat. No. 5,374,182 to Gessner uses a spring which deflects as the nozzle body and the air piston housing expand due to the increase in temperature. The sealing device uses Belleville style disc springs assembled on an insulating sleeve. As the manifold heats up the disc spring package absorbs the thermal expansion and prevents over-stressing the nozzle housing or setting of the manifold's plate steel.

This design provides a superior anti-leaking solution in many situations where the injection pressure remains relatively small. The disc spring system of the '182 patent loads the flange of the nozzle housing in a purely axial direction perpendicular to the interface surface between the nozzle and the manifold plate. By providing an axial sealing force, the profile of the sealing stress shows a significant decrease towards the melt channel relative to the peak achieved at the point of contact between the spring and the nozzle. In the event that the injection pressure reaches higher valves this improved design does not effectively prevent leakage of the molten plastic resin outside the passageway.

U.S. Pat. No. 5,507,637 to Schad et al. teaches a sealing clamp ring attached to the manifold and surrounding the nozzle housing that prevents leakage of the resin at the interface between the manifold and the nozzle. A certain lateral clearance that remains between the clamp ring and the nozzle allows the manifold and the clamp ring to slide laterally without affecting the alignment of the nozzle tip with respect the mold gate.

The design concepts of the '367, '182 and '637 patents represent a significant advance and use a sliding interface between the manifold and the nozzle housing. As the manifold heats and expands it also slides across the nozzle housings which are held in the cavity plate counter bores. This allows the nozzle tip location to be maintained in proper alignment with the mold gate, independent of the temperature of the manifold. However, in a sliding interface between the nozzle and the manifold it is difficult to fully seal the passageway between the conduits of the two parts using the sealing means disclosed in these references and one cannot achieve a sealing stress distribution which has its peak adjacent the passageway.

Accordingly, it is a principal object of the present invention to provide an improved method and apparatus for sealing the passageway between two conduits in an injection molding apparatus, especially between an injection nozzle conduit and a hot runner manifold conduit.

It is a further object of the present invention to provide an improved method and apparatus as aforesaid which obtains a sealing stress distribution which has its peak adjacent the conduits or passageways.

Further objections and advantages of the present invention will appear hereinbelow.

SUMMARY OF THE INVENTION

In accordance with the present invention, the foregoing objects and advantages are readily obtained.

The apparatus of the present invention seals the passageway between two conduits in an injection molding apparatus, comprising two abutting conduits for transporting molten plastic under pressure having an interface area between the abutting conduits, and means for sealing the two abutting conduits operative to create an angular sealing force upon said interface area. The apparatus particularly includes an injection nozzle with a conduit therein, wherein said injection nozzle conduit is a first of said abutting conduits, and a hot runner manifold with a conduit therein abutting said nozzle, wherein the manifold conduit is a second of said abutting conduits. Particularly, the sealing stress distribution has its peak adjacent the conduits and the interface.

The method of the present invention seals the passageway between two conduits in an injection molding apparatus, comprising providing two abutting conduits for transporting molten plastic under pressure with an interface area between the two abutting conduits, and sealing the interface area between the two abutting conduits to create an angular sealing force upon said interface. Preferably, a first of said abutting conduits is an injection nozzle conduit and a second of said abutting conduits is a hot runner manifold conduit, including the step of sealing the interface between said conduits with a sealing means which creates an angular sealing force on the interface between said conduits. Desirably, the sealing stress distribution has its peak adjacent the conduits and the interface.

Further features of the present invention will appear hereinbelow.

BRIEF DESCRIPTION OF THE DRAWINGS

The present invention will be more readily understandable from the following illustrative drawings, wherein.

DETAILED DESCRIPTION OF PREFERRED EMBODIMENTS

Figure 1:
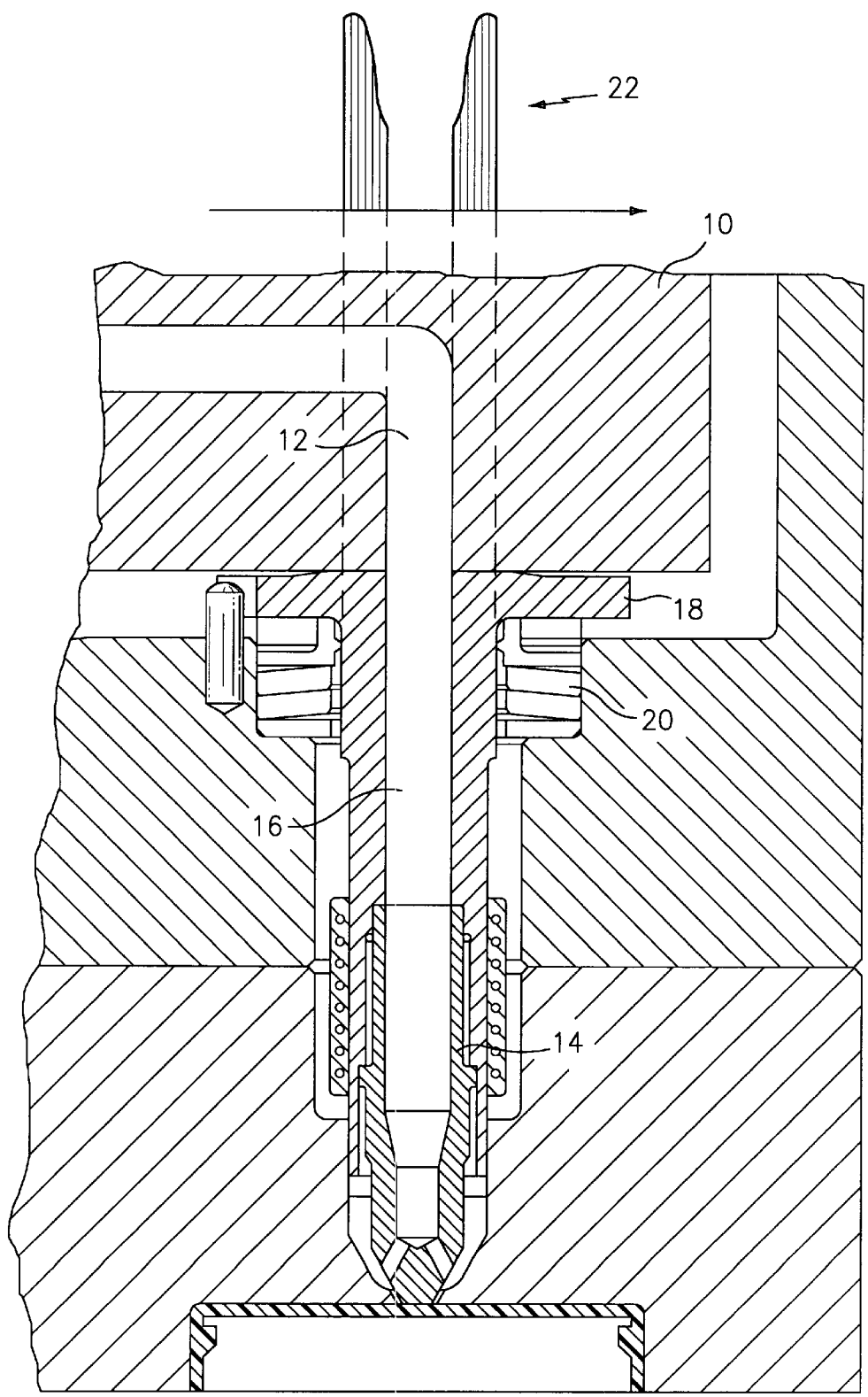
FIG. 1 illustrates a prior art sealing apparatus and sealing stress distribution curve therefor.

FIG. 1 is a prior art representation of the '182 patent including hot runner manifold 10 and manifold conduit 12, injection nozzle 14 having nozzle conduit 16 abutting manifold conduit 12. Nozzle 14 includes shoulder portion 18 abutting manifold 10 and two Belleville style disc springs 20 sealing the interface between the nozzle conduit 16 and manifold conduit 12. As the manifold heats up the disc spring package absorbs the thermal expansion and prevents over-stressing the nozzle housing or setting of the manifolds plate steel and provides improved anti-leaking characteristics. However, the disc spring system of FIG. 1 loads nozzle shoulder 18 in a purely axial direction perpendicular to the interface between nozzle conduit 16 and manifold conduit 12. Graph 22 above manifold 10 shows the sealing stress distribution at the interface between the nozzle conduit and manifold conduit and adjacent surfaces and shows a significant decrease in sealing stress or force towards the melt channel relative to the peak achieved at the point of contact between the spring and the nozzle. Thus, this device will not effectively prevent resin leakage when injection pressure reaches higher values.

Figure 2:
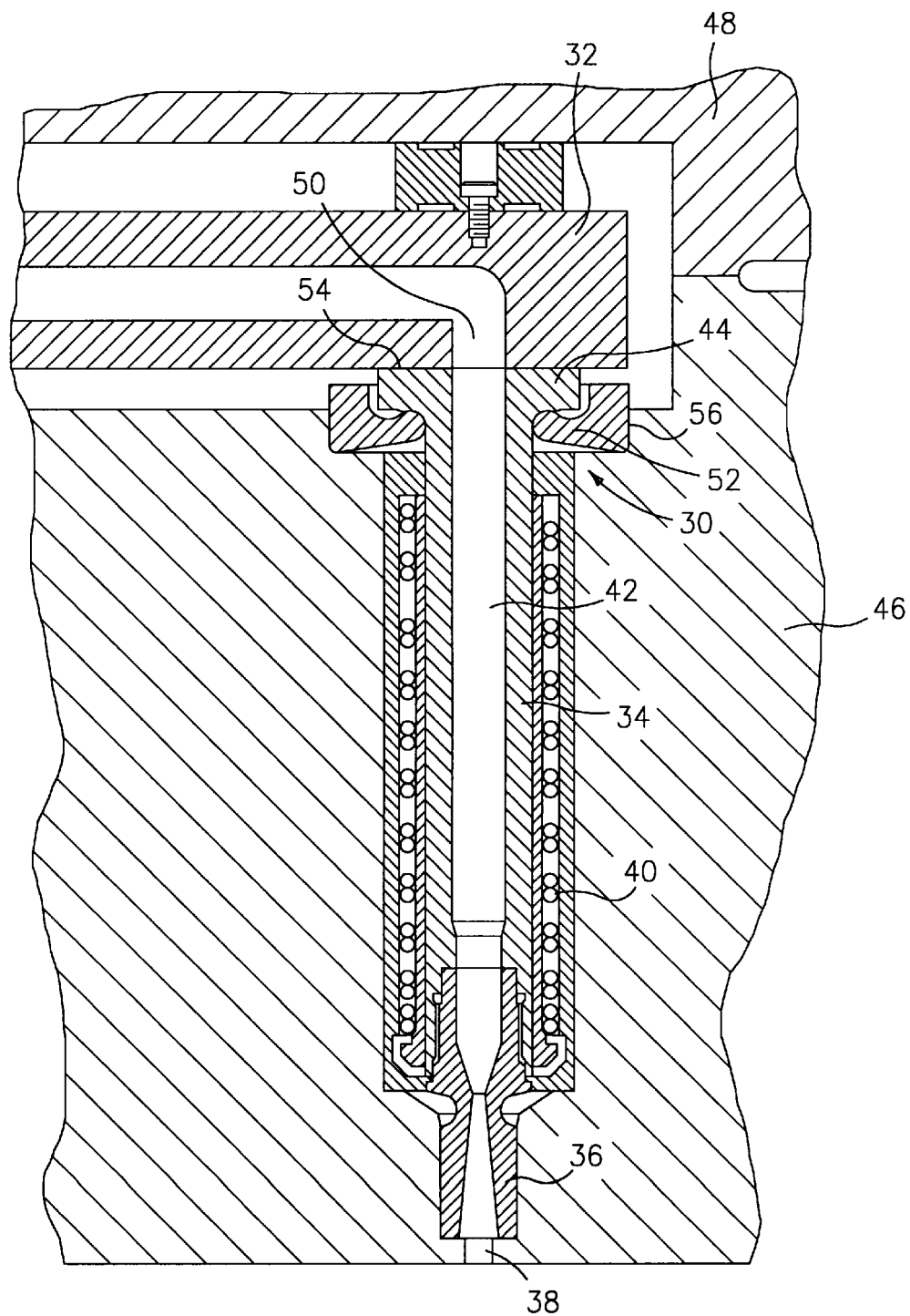
FIG. 2 illustrates an injection molding apparatus of the present invention.

FIG. 2 is a sectional view illustrating an embodiment of the apparatus and method of the present invention. In the embodiment of FIG. 2, hot tip type hot runner injection nozzle 30 cooperates with hot runner manifold block 32 to feed high pressure molten plastic to a mold cavity (not shown). The injection nozzle 30 can be of any suitable design, such as valve gated or edge gated, as this does not affect the design and efficacy of the present invention. The injection nozzle 30 includes nozzle body or housing 34 which terminates with nozzle tip 36 which is in alignment with mold cavity gate 38 which feeds a mold cavity (not shown). The nozzle housing 34 is usually surrounded by a heating element 40 that maintains the optimum temperature for the molten plastic flowing through nozzle channel 42 to the mold cavity. Nozzle housing 34 includes an upper flange or shoulder portion 44 which must be maintained in direct contact with hot runner manifold block 32 in order to prevent leakage at the interface between the nozzle and manifold. Manifold 32 is placed between mold cavity plate 46 and mold back plate 48 and includes a number of internal manifold conduits 50 carrying molten resin to a desired number of injection nozzles 30. Manifold conduit 50 directly abuts nozzle conduit 42 and is in fluid communication therewith and feeds molten resin from the manifold to the nozzle as clearly shown in FIG. 2. In accordance with the present invention, in order to prevent leakage of molten resin under injection pressure flowing from manifold conduit 50 to nozzle conduit 42, deflection sealing element 52 is positioned around nozzle 30 to generate a strong angular sealing force directed towards the interface area 54 between the nozzle and manifold conduits. As will be discussed hereinbelow, the particular construction of the sealing element may be varied, but it is significant that the sealing element create an angular sealing force on the interface area between the nozzle and manifold conduits. As shown in FIG. 2, sealing element 52 abuts nozzle shoulder 44 and is placed in a cylindrical recess 56 machined in the upper part of mold cavity plate 46.

Figure 4:
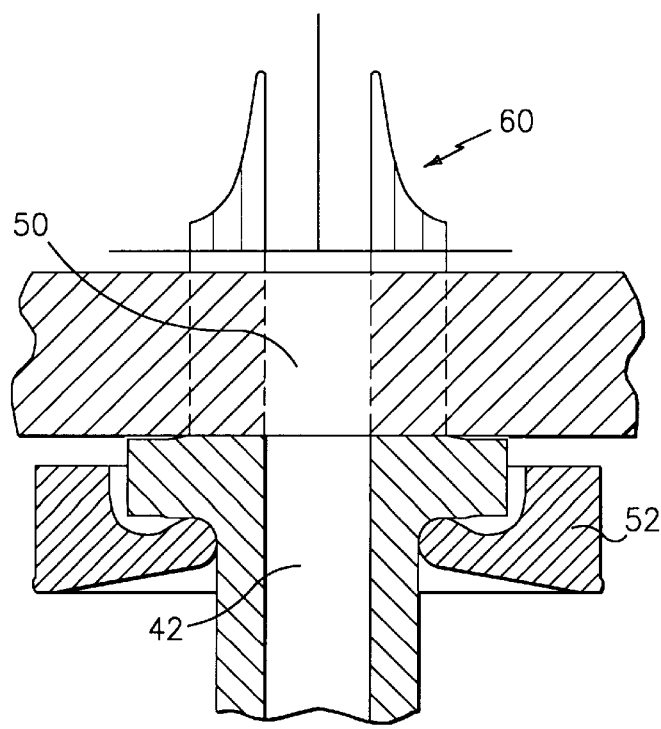
FIG. 4 is a detailed view of the sealing element-conduit interface of FIG. 2 and sealing stress distribution therefor.

The deflection ring or sealing element 52 first locates nozzle housing 34 in cavity plate 46 and second generates an angular sealing force and maintains sealing contact between the nozzle and manifold conduits over a wide operating temperature and injection pressure window. Unlike previous systems, the sealing force generated by the sealing system of the present invention responds to the initial pre-load and then to the continuous load generated by the operating conditions and factors in the mold, as the temperature gradient and injection pressure. Moreover, unlike previous systems, the sealing force generated by the sealing element of the present invention induces a sealing stress distribution that reaches a maximum value adjacent nozzle conduit 42 and manifold conduit 50, as can be clearly seen in sealing stress distribution curve 60 in FIG. 4. This represents a significant advantage and improvement in leakage prevention.

As shown in the embodiment of FIG. 2, there is a mating radial fit between deflection element 52 and nozzle shoulder portion 44 which creates strong contact between the nozzle and manifold and allows maximum transmission of the sealing force from the deflection element to the interface between the nozzle and manifold conduits along a preferential radial direction.

Naturally, the system of the present invention can be effectively employed in other conduit connections in an injection molding apparatus where leakage of molten resin may be a problem, as for example, in other manifold connections.

Figure 3A:
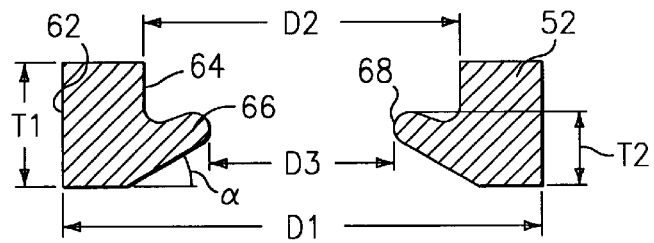
FIG. 3A is a detailed view of the sealing element of FIG. 2

The preferred embodiment of sealing element 52 is shown in more detail in FIG. 3A. Element 52 is a substantially flat ring or disc having an outer surface 62 with a first diameter D1, a first thickness T1, a first inner surface 64 with a second diameter D2 smaller than D1. In addition, element 52 has an inner angular portion 66 with a third diameter D3 smaller than D2 and a second thickness T2 smaller than T1. The inner surface 64 includes inner angular portion 66 which desirably has a rounded end 68. The sealing or deflection element may have a shape other than a disc, as a square, hexagonal or any desirable noncircular profile. Outer surface 62 could be smooth and have substantially the same diameter as the cylindrical recess 56.

Figure 3B:
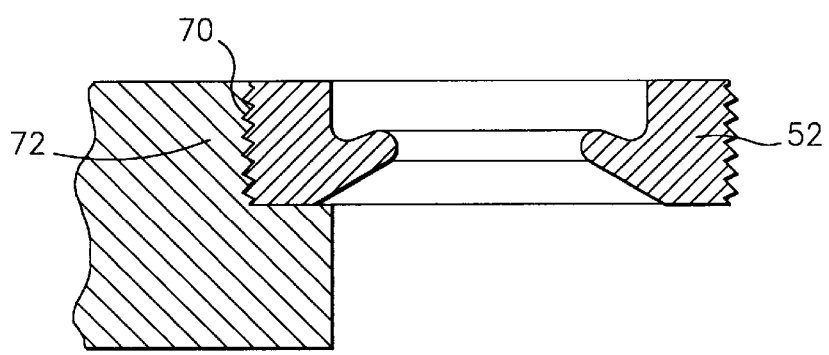
FIG. 3B is an alternate embodiment similar to FIG. 3A.

In the embodiment of FIG. 3B, element 52 is provided with outer thread 70 and this can be threaded into the corresponding cylindrical recess 72. This would make it easier to place and replace the element 52 during assembly or servicing.

Angular portion 66 defines an angle a with respect to the nozzle conduit as shown in FIG. 3A which desirably is between 5° and 30° which insures that the sealing force is angularly directed towards the interface between the nozzle and manifold conduits.

Figure 5:
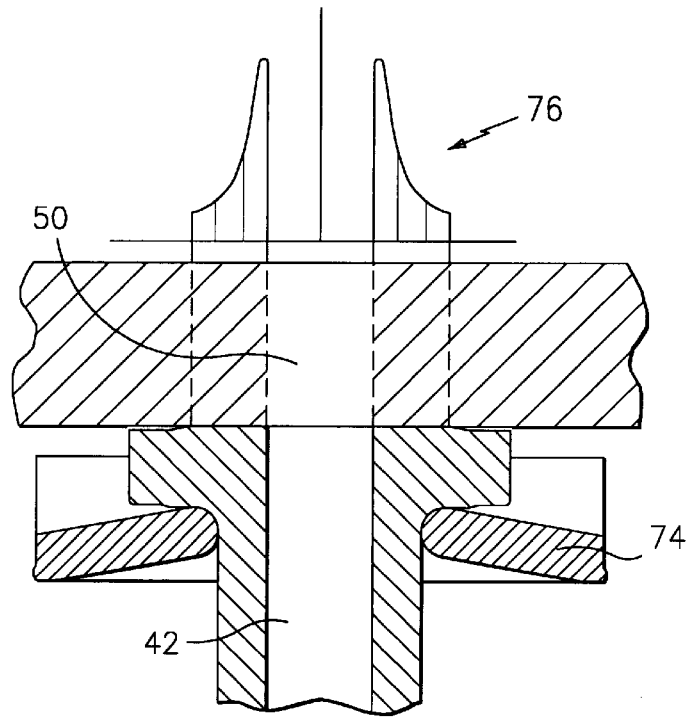
FIG. 5 is an alternate embodiment similar to FIG. 4.
Figure 6:
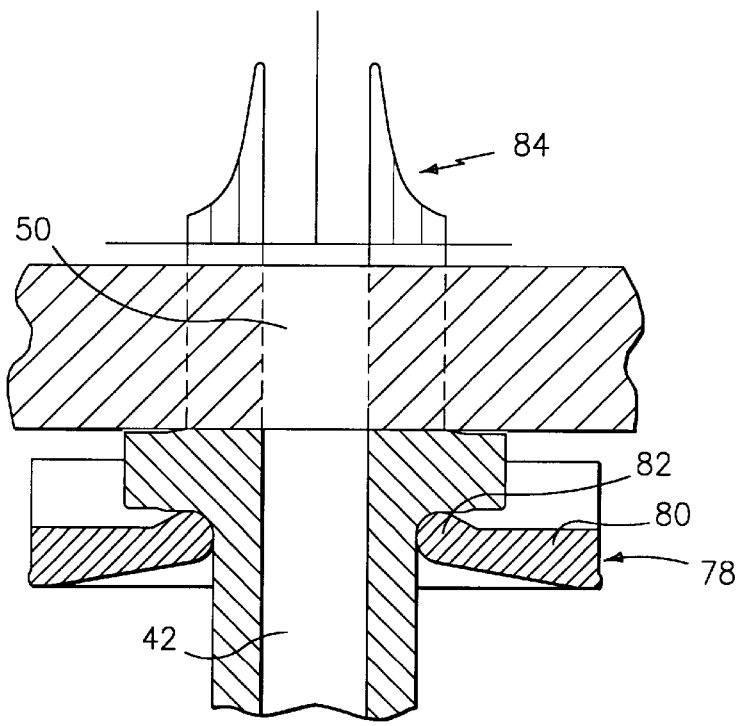
FIG. 6 is a still further embodiment similar to FIG. 4.

FIGS. 5 and 6 show alternate embodiments of sealing elements, with FIG. 5 showing a flat, disc-like element 74 which also creates an angular sealing force and achieves the sealing stress distribution shown in distribution curve 76 which has its peak adjacent the conduits, and with FIG. 6 showing a flat, disc-like element 78 with a flat body portion 80 and an annular tip 82 upwardly directed relative to body portion 80, which also achieves a sealing stress distribution which has its peak adjacent the conduits as shown in distribution curve 84.

The deflection element can be made of various materials or material combinations, with the final selection based on particular molding conditions. Preferably, the element is made of a high thermally conductive material, such as high strength steel. Alternatively, the element may be made of a material with lower thermal conductivity than the material of the nozzle housing, as titanium or a titanium alloy and the nozzle housing of copper or copper beryllium. In some applications this makes the sealing even more reliable due to the additional force created when the high thermal radial expansion of the nozzle is limited by the lower thermal expansion of the deflection ring which is also surrounded by a cold mold plate. Alternatively, the deflection ring could have a core portion made of steel and a skin portion made of low thermal conductivity material (insulator) or only a coating layer of an insulator. Naturally, other options may be used.

In operation, an interference fit is created between the sealing ring and the nozzle shoulder portion. An intimate radial fit between the ring and the shoulder will insure that the interference fit is maintained during a broad spectrum of operating conditions, such as temperature and pressure variations.

This initial interference fit is firstly created in cold conditions and produces a significant angular force component directed towards the interface between the two channels to be sealed. This initial sealing force is strong enough to seal the manifold and the nozzle in the event of a cold start of the molding process that may occur by accident.

By using the initial interference fit, the importance of pre-loading the entire hot runner system is less critical to insure an effective sealing operation. During the injection molding pressure, the temperature gradient and the cyclic injection pressure creates additional forces between the nozzle and the sealing ring. Unlike the sealing elements known in the art, deflection sealing ring of the present invention is responsive to the operating conditions in the mold in such a manner that the sealing force acting angularly towards the passageway to be sealed increases with the increase of the temperature and the injection pressure.

In this manner much wider temperature and pressure operating windows can be handled without having leakage problems. The specific geometry and tolerances for the sealing ring and the cylindrical recess are not very critical as long as the sealing force is angularly directed towards the passageway between the two channels. Moreover, the present invention responds to the changes in the operation conditions, especially to the temperature gradient.

Experiments have indicated that the sealing force is effective for injection pressures below 35,000 psi and temperature variations of 50° C. if proper materials are selected and the interference fit has been achieved in the cold conditions.

Naturally, a wide variety of other geometries of the sealing ring may be used within the parameters herein, with the resulting radial sealing force generating the required sealing force in both cold and hot conditions. The effect of this force is two-fold, first of all it slightly deforms the nozzle's shoulder upper surface. Second, it generates a sealing stress distribution that reaches its maximum value immediately adjacent to the outer surface of the channels to be sealed, in between the manifold and the nozzle.

Alternatively, an additional element or elements can be used in conjunction with the sealing element herein in order to, for example, better address heat transfer in the area, such as ceramic rings or titanium rings or other low thermally conductive materials.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. Method for sealing the passageway between two conduits in an injection molding machine, which comprises: providing two abutting conduits having a common longitudinal axis for transporting molten plastic under pressure with an interface area between the two abutting conduits; and sealing the interface area between the two abutting conduits by a sealing element that induces a sealing stress distribution that reaches a maximum value adjacent the common axis and decreases radially outwardly from the common axis.

2. Method according to claim 1, wherein a first of said abutting conduits is an injection nozzle conduit and a second of said abutting conduits is a hot runner manifold conduit, including the step of sealing the interface area between said conduits with a sealing means which generates a sealing force directed towards the interface between said conduits, with greater force directed towards the longitudinal axis.

3. Method according to claim 2, including providing an injection nozzle shoulder adjacent said injection nozzle conduit and positioning a deflection sealing element abutting said shoulder to create said sealing force on said interface.

4. Method according to claim 3, wherein said shoulder includes a portion abutting said nozzle conduit and a portion spaced from said nozzle conduit, including the step of creating greater sealing stress on that portion of the shoulder abutting the nozzle conduit with said deflection sealing element.

5. Method according to claim 2, wherein said sealing means is a deflection sealing element which at least in part creates an angle between 5° and 30° with respect to the nozzle conduit.

* * * * *